United States Patent [19]
Zenz

[11] 4,140,497
[45] Feb. 20, 1979

[54] SCREENLESS GRANULAR BED FILTER

[75] Inventor: Frederick A. Zenz, Garrison, N.Y.

[73] Assignee: The Ducon Company, Inc., Mineola, N.Y.

[21] Appl. No.: 759,969

[22] Filed: Jan. 17, 1977

Related U.S. Application Data

[63] Continuation-in-part of Ser. No. 733,650, Oct. 18, 1976.

[51] Int. Cl.² .............................................. B01D 46/04
[52] U.S. Cl. .......................................... 55/96; 55/98; 55/282; 55/302; 55/517
[58] Field of Search ............... 55/96, 302, 98, 282, 55/512–513, 515–519; 210/263, 269, 275

[56] References Cited

U.S. PATENT DOCUMENTS

| 3,056,247 | 10/1962 | Pindzola et al. | 55/516 |
| 3,412,863 | 11/1968 | Stuart, Sr. | 210/82 |
| 3,680,284 | 8/1972 | Schmelling | 55/387 |
| 3,798,882 | 3/1974 | Kalen | 55/302 |
| 3,912,466 | 10/1975 | Zenz | 55/302 |

Primary Examiner—Bernard Nozick
Attorney, Agent, or Firm—Seidel, Gonda & Goldhammer

[57] ABSTRACT

A granular bed filter, capable of being backwashed, is disclosed without screens. The filter beds of granular material are generally U-shaped in section.

9 Claims, 4 Drawing Figures

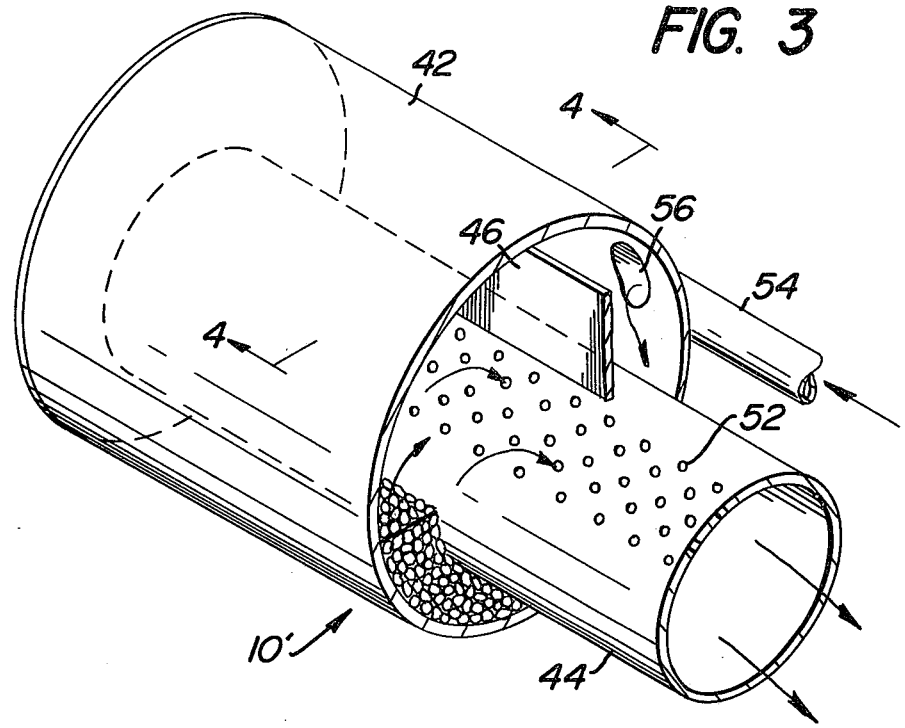
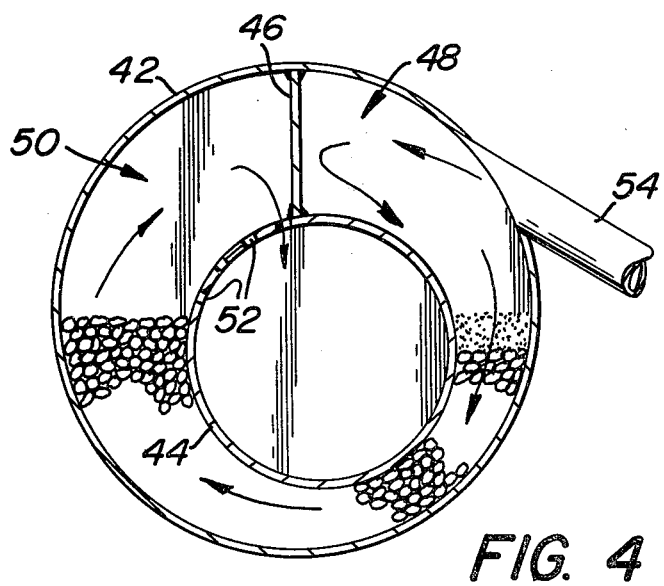

SCREENLESS GRANULAR BED FILTER

RELATED CASE

This application is a continuation-in-part of said application Ser. No. 733,650 filed on Oct. 18, 1976 and entitled "Granular Bed Filter".

BACKGROUND

Granular bed filters have at least an inlet screen and in some cases a bed support screen. See U.S. Pat. Nos. 3,410,055 and 3,798,882.

When the temperature of the gas being filtered is high, such as above 1600° F., and/or contains for example 1.4% hydrogen sulfide, the metallurgical requirements prohibit the use of metallic bed support screens or perforated plates. For the same reasons, an inlet screen cannot be used.

The problem solved by this invention is the provision of a granular bed filter lacking an inlet screen and lacking a support screen in a manner whereby the granular bed material is not lost during operation or during backwashing of the granular material which at least in part is subjected to cleaning by fluidization.

SUMMARY OF THE INVENTION

The granular bed filter of the present invention includes a housing having an inlet and an outlet. Walls of the housing are arranged so as to define at least one U-shaped passageway between the inlet and outlet. A bed of granular filter material is supported in said passageway for filtering dirty gas flowing from said inlet to said outlet.

In the preferred embodiment of the present invention, the cross sectional area of the passageway at the end thereof communicating with the outlet is greater than the corresponding area of the end of the passageway communicating with the inlet. Also, the size of the granular material in said passageway and exposed to the inlet is smaller than the size of the granular material in said passageway and exposed to the outlet.

It is an object of the present invention to provide a granular bed filter capable of operating at high temperatures without a support screen or inlet screen while at the same time providing a granular bed filter which may be backwashed by fluidizing at least part of the granular material.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a perspective view partially cut away for illustrating another embodiment of the present invention.

FIG. 4 is a sectional view taken along the line 4—4 in FIG. 3.

Referring to the drawing in detail, wherein like numerals indicate like elements, there is shown in FIG. 1 a granular bed filter in accordance with the present invention designated generally as 10.

Figure 1:
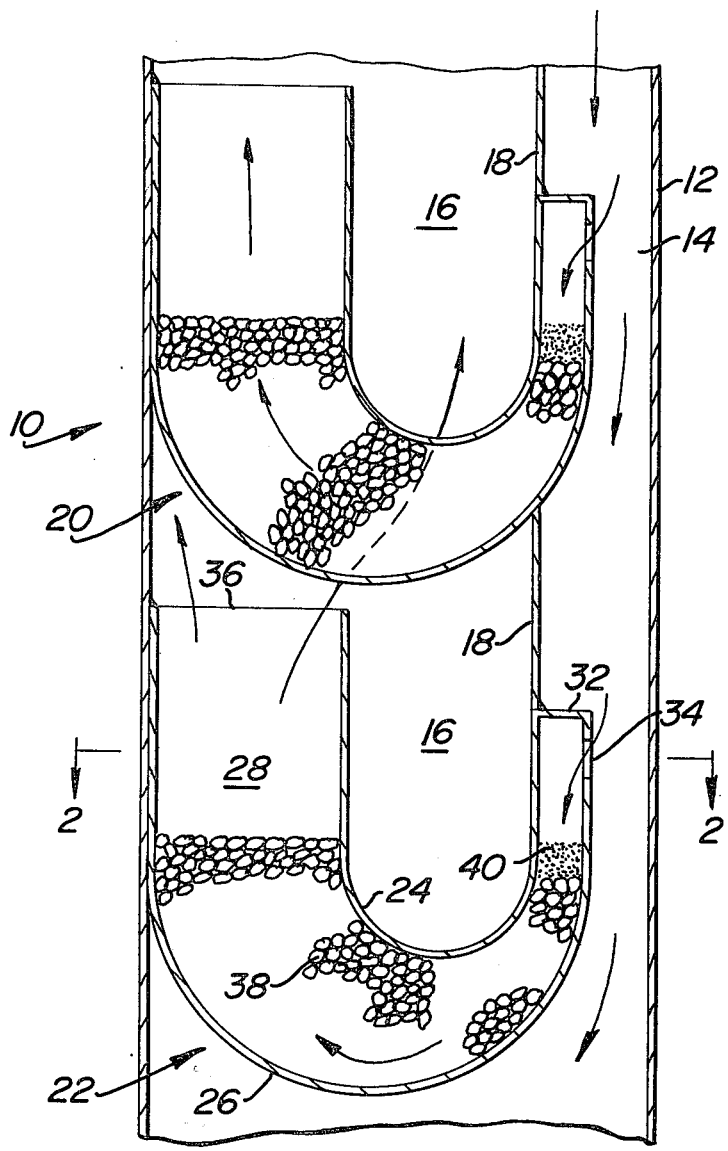
FIG. 1 is a vertical sectional view through a granular bed filter in accordance with the present invention.

The filter 10 includes a housing 12 having an inlet manifold 14 and an outlet manifold 16. The inlet manifold 14 is separated from the outlet manifold 16 by a partition wall 18. It will be noted that the partition 18 divides the interior of the housing 12 in a manner so that the inlet manifold 14 is substantially smaller in cross sectional area than the outlet manifold 16.

The filter 10 includes a plurality of filter chambers having an inlet end communicating with the inlet manifold 14 and an outlet end communicating with the outlet manifold 16. The walls of the housing 10 for defining the filter chambers are preferably prefabricated so as to have their inlet end secured in a cut-out opening in the partition wall 18. In FIG. 1, the housing 12 includes filter chambers 20 and 22 which are identical. Hence, only filter chamber 22 will be described in detail.

Figure 2:
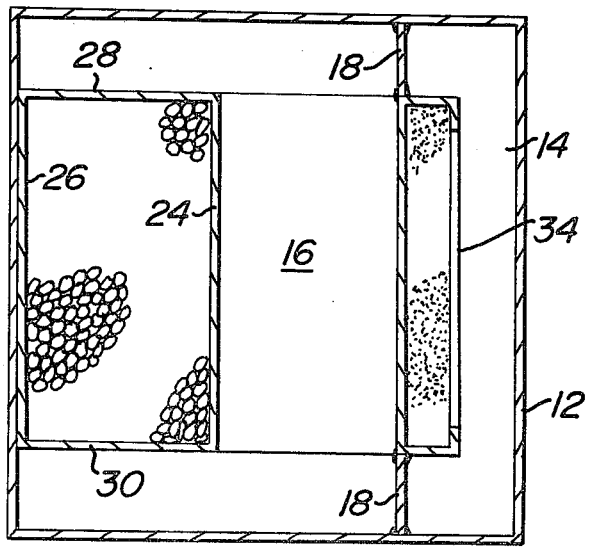
FIG. 2 is a transverse sectional view taken along the line 2—2 in FIG. 1.

The filter chamber 22 is U-shaped in transverse section as shown in FIG. 1 with a curved top wall 24 and a curved bottom wall 26 interconnected by side walls 28 and 30. The distance between the side walls 28 and 30 is less than the transverse dimensions across the housing 12 as shown in FIG. 2.

An end wall 32 interconnects the upper edge of the walls 24, 26, 28 and 30 at the inlet end thereof. An inlet opening 34 is provided in the bottom wall 26. The filter chamber 22 communicates with the outlet manifold 16 by way of an outlet opening 36. While it is preferred to have the opening 36 at an elevation above the elevation of opening 34, they may be substantially the same elevation.

The bight portion and the portion of the legs of the filter chamber 22 is filled with a bed of granular material 38. The granular material 38 is preferably a coarse material such as Alundum particles having transverse dimensions of approximately one-quarter inch. On the inlet end of the granular material 38, there is provided a thin layer 40 of fine granular material such as that disclosed in my above-mentioned application and the above-mentioned patents.

The cross sectional area of the filter chamber 22 adjacent the outlet opening 36 is substantially greater than that of the filter chamber 22 adjacent the inlet opening 34. In other words, the top and bottom walls 24, 26 are divergent adjacent the outlet opening 36. The purpose of the enlarged cross sectional area adjacent the outlet opening 36 is to reduce the superficial gas velocity thereby compensating for any increase in pressure drop due to the length of the filter path through the granular materials 38 and 40. The layer of granular material 40 is spaced from the elevation of the inlet opening 34 by a distance so that the layer of granular material 40 may be fluidized in the space thereabove without flowing out of the opening 34. This feature is explained in greater detail in my above-mentioned co-pending application. With the layer of granular material 40 having a thickness of three inches, the upper surface thereof will be spaced from the lower edge of opening 34 by a distance of approximately seven inches.

The interface between the coarse granular material 38 and the layer 40 of fine granular material is preferably horizontally disposed to assure uniform fluidizing reverse flow gas distribution. During backwashing, the layer 40 of granular material will be fluidized into the space thereabove without any lifting or fluidizing of the coarse granular material 38. The large interface between the materials 38, 40 assures that the reverse flow cleaning gas velocity will be insufficient to fluidize the coarse granular material 38. The interface between the materials 38, 40 extends across the full width and length of the inlet end of the filter chamber 22.

Dirty gas at an elevated temperature with or without highly corrosive components is introduced into the inlet manifold 14. The dirty gas enters the filter chambers 20, 22 through the inlet opening, is filtered as it passes downwardly through the layer 40 of fine granular material, is further filtered as it passes through the granular material 38, and then exits into the outlet manifold 16. When it is desired to clean the filter beds, backwash gas such as air is introduced into the outlet manifold 16 at a low pressure such as 80 psi above the operating pressure in manifold 16. the backwash gas flows through the coarse granular material 38 and envelopes any accumulated dust in the interstices between the coarse granular material 38. The backwash gas then passes upwardly through the interface between materials 38, 40 and fluidizes the granular material 38 into the space thereabove but below the elevation of the inlet opening 34. The backwash gas then passes out the inlet opening 34 into the inlet manifold 14. Accumulated contaminants in the layer 40 of granular material is removed therefrom as the material is fluidized.

In FIGS. 3 and 4, there is illustrated another embodiment of the present invention designated generally as 10'. The filter 10' includes a housing defined by the outer pipe 42 and the inner pipe 44 coupled together by way of a partition wall 46 which divides the annular space between the pipes into an inlet manifold 48 and an outlet manifold 50. It will be noted that the pipes 42, 44 are nonconcentric so as to define a U-shaped passageway between the manifolds 48 and 50 with the larger cross sectional area of the passageway being provided adjacent the outlet manifold 50 for the reasons discussed above. Dirty gas is supplied to the inlet manifold 48 by way of the conduit 54.

Clean gas from the outlet manifold 50 flows into the pipe 44 by way of holes 52. The filter 10' may have a plurality of filter chambers along the length of the pipes 42, 44. The ends of pipe 42 are closed at each end by an end wall whereas the pipe 44 may be open at both ends or may be closed at one end depending upon the desired distribution of the clean air therewithin. The U-shaped passageway is filled with the granular material, coarse and fine as described above. The elevation of the fine granular material is spaced below the inlet opening 56 in accordance with the description set forth above so that the fine granular material is not lost when being backwashed.

When filters 10 and 10' are used with high temperature and/or corrosive gases, the walls of the housings may be made from ceramic or refractory material. Preferably, the walls of the housing exposed to contact with the dirty corrosive gas are made from metal coated on its exposed surface with a thin layer of ceramic in accordance with conventional procedures utilized heretofore for making kitchen sinks, bathtubs, and the like. As will be apparent from the above description and the illustration in the drawings, the filter of the present invention is easily fabricated from readily available materials requiring little machining. For example, the embodiment in FIGS. 3 and 4 has the advantage of permitting the use of readily available tubes with tube 44 being surrounded by tube 42. The U-shaped passageway, divergent at its outlet end, is attained by positioning the tubes so as to be non-concentric. The absence of inlet screens or support screens decreases the cost of the filter while at the same time eliminating a component which is highly subject to corrosion.

The present invention may be embodied in other specific forms without departing from the spirit or essential attributes thereof and, accordingly, reference should be made to the appended claims, rather than to the foregoing specification as indicating the scope of the invention.

I claim:

1. A method comprising the steps of filtering gas to remove contaminants therefrom by passing the gas downwardly through one end of a U-shaped passageway defined by imperforate walls and containing a bed of granular filter material, and reducing the velocity of the gas as it exits from said U-shaped bed of filter material, and performing said filtering step without the use of screens of perforated support plates, using granular material of at least two sizes, the smaller size granular material being a minor portion of the granular material and being a layer not more than three inches high at the inlet end of the passageway and substantially below the elevation of an inlet to said passageway so as to provide sufficient space thereabove for fluidizing the fine granular material without loss of the fine granular material through the inlet during backwashing.

2. A method in accordance with claim 1 including using an imperforate portion of spaced non-concentric curved wall portions to define the U-shaped passageway.

3. A granular bed filter lacking screens or perforated support plates for granular filter material comprising a housing having an inlet and an outlet, walls of said housing defining a U-shaped passageway, one end of said passageway communicating with said inlet, the other end of said passageway communicating with said outlet, a bed of granular filter material in said passageway, a cross sectional area of said passageway at said other end thereof being greater than the cross sectional area of said one end of said passageway, said U-shaped passageway being defined by spaced upper and lower walls which are imperforate in the area juxtaposed to the granular filter material, a plurality of said passageways provided within said housing, said housing including an inlet manifold communicating with the inlet of each passageway, said housing including an outlet manifold communicating with the outlet of each passageway, said passageways being disposed at different elevations within said housing.

4. A filter in accordance with claim 3 wherein a major portion of the granular filter material is coarse granular material with the remainder being fine granular material, a layer of the fine granular material being provided only at said one end of said passageway and being spaced from said inlet by a distance sufficiet to permit the layer of fine granular material to be fluidized into the space thereabove without passing through the inlet to said passageway.

5. A granular bed filter comprising a housing having an inlet and an outlet, walls of said housing defining a U-shaped passageway between said inlet and outlet, one end of said passageway communicating with said inlet, the other end of said passageway communicating with said outlet, a bed of granular filter material in said passageway, the top surface of said granular material at said one end of said passageway being spaced below the elevation of the inlet by a distance sufficient to permit the granular material to be fluidized into the space thereabove during backwashing without the granular material being lost by passing through the inlet, and means for introducing a backwash fluid into said outlet to facilitate said fluidizing of said granular material without disturbing the granular material exposed to said outlet.

6. a granular bed filter in accordance with claim 5 wherein said granular filter material is in two sizes, most of the filter material being of a coarse size and being the only size granular material exposed to the outlet, a layer of fine granular material overlying the coarse granular material only at the inlet end of said passageway whereby the fine granular material is the only material fluidized into said space.

7. A filter in accordance with claim 5 wherein the cross sectional area of said other end of said passageway is greater than the cross sectional area of said one end.

8. A filter in accordance with claim 7 wherein said granular filter material is in two sizes, most of the filter material being of a coarse size, with a layer of fine granular material overlying the coarse granular material only at the one end of the passageway.

9. A filter in accordance with claim 5 wherein said housing includes a plurality of said passageways disposed one above the other, an inlet manifold communicating with each passageway inlet, and an outlet manifold communicating with each passageway outlet.

* * * * *

UNITED STATES PATENT AND TRADEMARK OFFICE
CERTIFICATE OF CORRECTION

PATENT NO. : 4,140,497
DATED : February 20, 1979
INVENTOR(S) : Frederick A. Zenz It is certified that error appears in the above—identified patent and that said Letters Patent is hereby corrected as shown below:

Column 4, line 15, change "of" second occurrence to -- or --.

Signed and Sealed this

Fourth Day of May 1982

[SEAL]

Attest:

GERALD J. MOSSINGHOFF

Attesting Officer     Commissioner of Patents and Trademarks